(12) United States Patent
Zhang et al.

(10) Patent No.: US 12,118,418 B2
(45) Date of Patent: *Oct. 15, 2024

(54) SYSTEM AND METHOD FOR AUTOMATICALLY CLASSIFYING PRINTABLE IMAGES (71) Applicant: ZEBRA TECHNOLOGIES CORPORATION, Lincolnshire, IL (US)

(72) Inventors: Yan Zhang, Buffalo Grove, IL (US); Chih Huan Chien, Buffalo Grove, IL (US); David E. Coons, Moorpark, CA (US); Victor L. Salmons, Gurnee, IL (US); Leo T. Lowy, Lake Villa, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,008

(22) Filed: Oct. 23, 2023

(65) Prior Publication Data
US 2024/0054307 A1 Feb. 15, 2024

Related U.S. Application Data (63) Continuation of application No. 17/968,793, filed on Oct. 18, 2022, now Pat. No. 11,797,808, and a continuation of application No. 17/205,733, filed on Mar. 18, 2021, now Pat. No. 11,475,259.

(51) Int. Cl.
G06K 15/00 (2006.01)
G06K 15/02 (2006.01)

(52) U.S. Cl.
CPC ..... G06K 15/4065 (2013.01); G06K 15/1822 (2013.01); G06K 15/021 (2013.01)

(58) Field of Classification Search
None
See application file for complete search history.

(56) References Cited

U.S. PATENT DOCUMENTS

2018/0300828 A1* 10/2018 Wang .................... G06F 40/174

* cited by examiner

Primary Examiner — Lennin R Rodriguezgonzalez (57) ABSTRACT

A method for classifying media to be printed comprising: receiving, at a printing device, print data representing the media to be printed; generating an image of the media based on the print data; classifying the image to obtain a media stock type associated with the media; printing the media according to the print data; and updating a stock of the media stock type.

18 Claims, 6 Drawing Sheets

SYSTEM AND METHOD FOR AUTOMATICALLY CLASSIFYING PRINTABLE IMAGES

RELATED APPLICATION

This patent application is a continuation of U.S. patent application Ser. No. 17/968,793, filed on Oct. 18, 2022, which is a continuation of U.S. application Ser. No. 17/205,733, now U.S. Pat. No. 11,475,259 filed Mar. 18, 2021, each of which is hereby incorporated by reference herein in their entirety.

BACKGROUND

Printers may be configured to print many different types of media, such as different labels and tags having different formats, sizes, and pre-printed material, and as such, may use different stock types. Changes in the media stock type may be difficult to track, as printer odometers generally cannot track such changes in media stock type or track only a single stock level. This may cause problems in management and accuracy of the media stock tracking and supply.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for classifying media to be printed, the method comprising: receiving, at a printing device, print data representing the media to be printed; generating an image of the media based on the print data; classifying the image to obtain a media stock type associated with the media; printing the media according to the print data; and updating a stock of the media stock type.

Additional examples disclosed herein are directed to a non-transitory computer-readable medium storing a plurality of computer-readable instructions executable by a processor, wherein execution of the instructions configures the processor to: obtain an image of media to be printed, the image generated based on print data for the media; classify the image to obtain a media stock type associated with the media; and update a stock of the media stock.

Additional examples disclosed herein are directed to a printing device comprising: a printhead; a memory; and a processor interconnected with the printhead and the memory, the processor configured to: receive print data representing media to be printed; generate an image of the media based on the print data; classify the image to obtain a media stock type associated with the media; control the printhead to print the media according to the print data; and update a stock of the media stock type in the memory.

Figure 1:
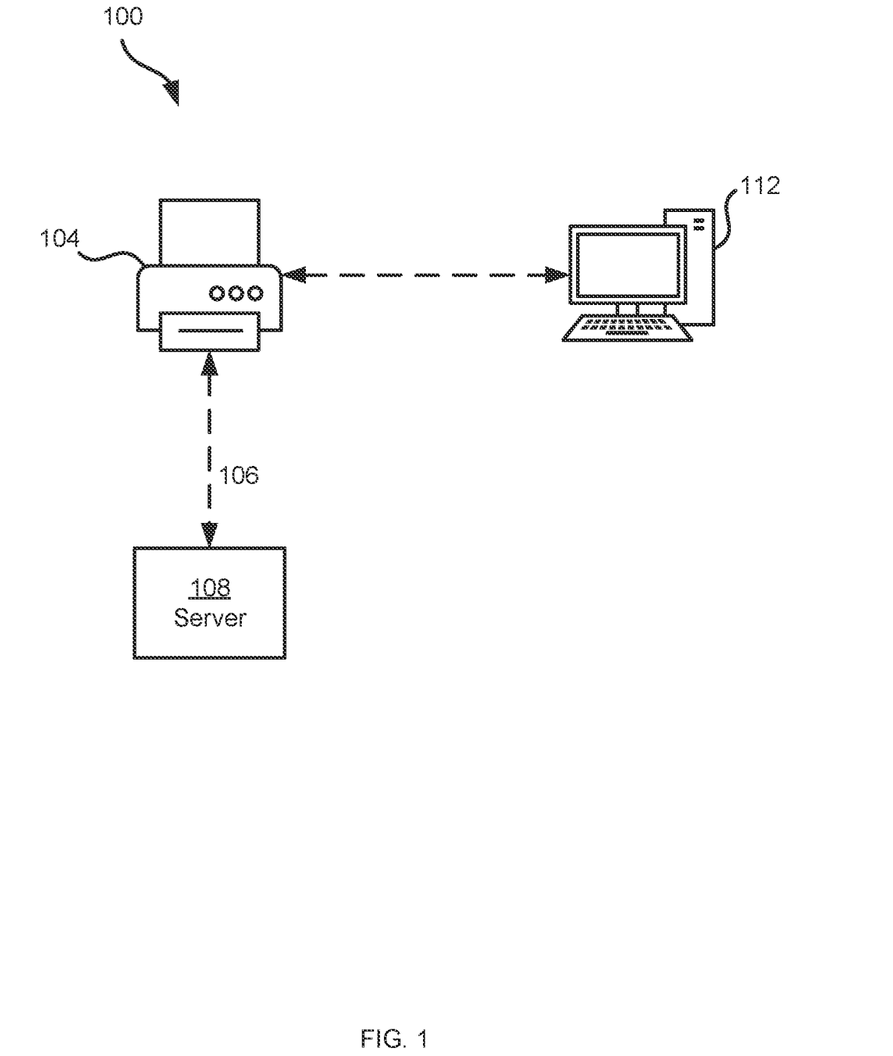
FIG. 1 is a block diagram of an example media classification system.

FIG. 1 depicts a system 100 for tracking media stock using media classification. The system 100 includes a printing device 104 in communication with a server 108 and a computing device 112 via communication links 106. The system 100 is deployed to automatically tracking media stock of different media stock types used by the printing device 104. In particular, the system 100 may be used to track media stock types which conform to structured data formats, such as labels, tags, product stickers, and the like. The structured data formats may include headings, predefined logos or images, tables, barcodes, and the like. Advantageously, rather than relying on metadata or configuration settings which specify the type of stock being used, the system 100 analyzes the print data itself to generate an image of the media being printed and classifies the image to obtain the media stock type. The classification of the media stock type based on the image of the media allows the system 100 to automatically update media stock levels, trigger low media stock warnings, and dynamically recognize new media stock types.

The printing device 104 is generally configured to print media such as labels, tags, documents, and other media. In particular, the printing device 104 may be configured to print media having different media types—i.e., media having different prescribed stock rolls on which they are printed, varying, for example based on size, shape, pre-printed format, or the like. The internal components of the printing device 104 will be described in further detail below.

The printing device 104 may be in communication with the server 108 to communicate stock levels, stock needs, and the like. In some examples, the print data may be communicated by the printing device 104 to the server 108 to perform the media classification analysis to update media stock levels at the server 108.

The printing device 104 may further be in communication with one or more computing devices 112 from which the printing device 104 receives print instructions. For example, the computing device 112 may be a desktop computer, a laptop computer, a server, or a mobile computing device, such as a tablet, a mobile phone, or the like.

The communication links 106 may be wired or wireless or combinations of wired and wireless links. For example, the links 106 may be provided by a wireless local area network (WLAN) deployed by one or more access points (not shown). In some examples, the server 108 may be located remotely from the printing device 104, and hence the links 106 may therefore include one or more wide-area networks such as the Internet, mobile networks, and the like.

Figure 2:
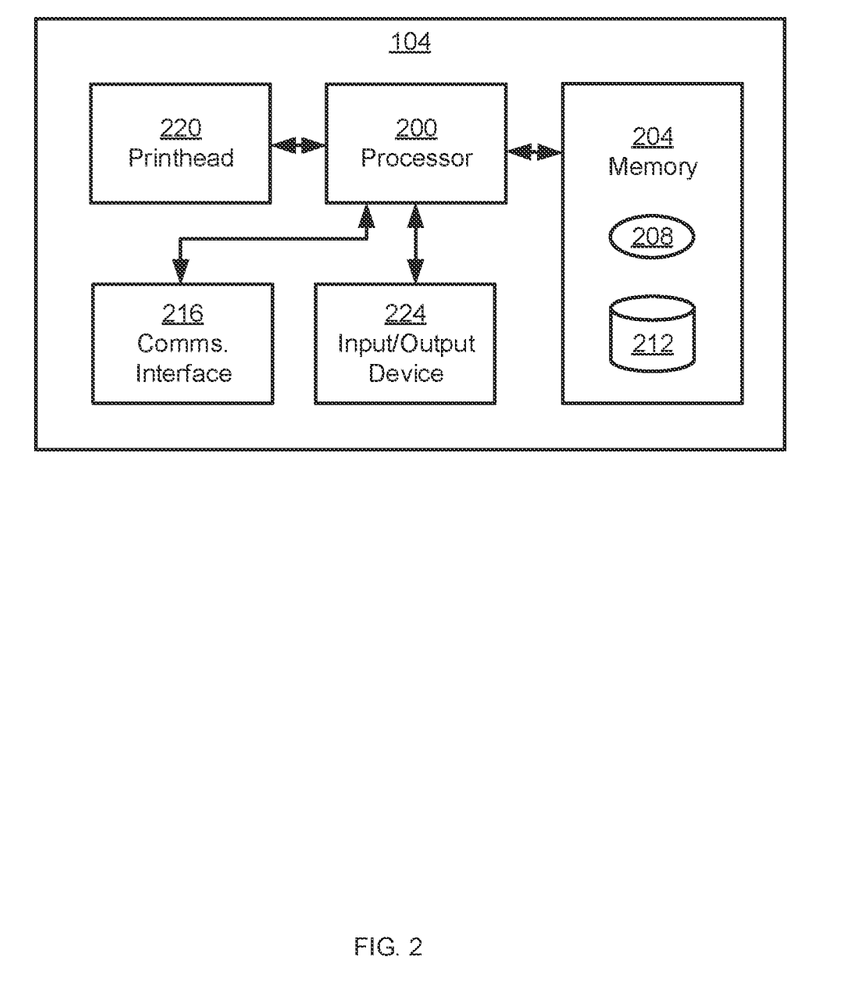
FIG. 2 is a block diagram illustrating certain internal components of a printing device in the system of FIG. 1.

Referring to FIG. 2, the printing device 104, including certain internal components, is shown in greater detail. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores a control application 208 which, when executed by the processor 200, configures the processor 200 to perform various functions discussed below in greater detail and related to the data extraction operation of the device 104. The application 208 may also be implemented as a suite of distinct applications. The processor 200, when so configured by the execution of the application 208, may also be referred to as a controller 200.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the data extraction operations discussed herein.

The memory 204 also stores a repository 212 containing, for example, associations between media stock types, stock levels, and the like. The repository 212 may also include data for the media classification operation, such as signature maps associated with each of the media stock types. Other rules for use in the media classification operation performed by the device 104 may also be stored in the repository 212.

The device 104 also includes a communications interface 216 interconnected with the processor 200. The communications interface 216 includes suitable hardware (e.g. transmitters, receivers, network interface controllers and the like) allowing the device 104 to communicate with other computing devices—particularly the server 108 and the computing device 112—via the links 106. The specific components of the communications interface 216 are selected based on the type of network or other links that the device 104 is to communicate over.

The device 104 further includes a printhead 220 configured to print the media in accordance with print data received, for example, from the computing device 112.

The device 104 further includes one or more input and/or output devices 224. The input devices 224 can include one or more buttons, keypads, touch-sensitive display screens or the like for receiving input from an operator, for example to initiate a printing operation and/or the media classification operation associated with a printing operation. The output devices 224 can further include one or more display screens, sound generators, vibrators, or the like for providing output or feedback to an operator, for example to output the media type.

The functionality of the device 104, as implemented via execution of the applications 208 by the processor 200 will now be described in greater detail, with reference to FIG. 3.

Figure 3:
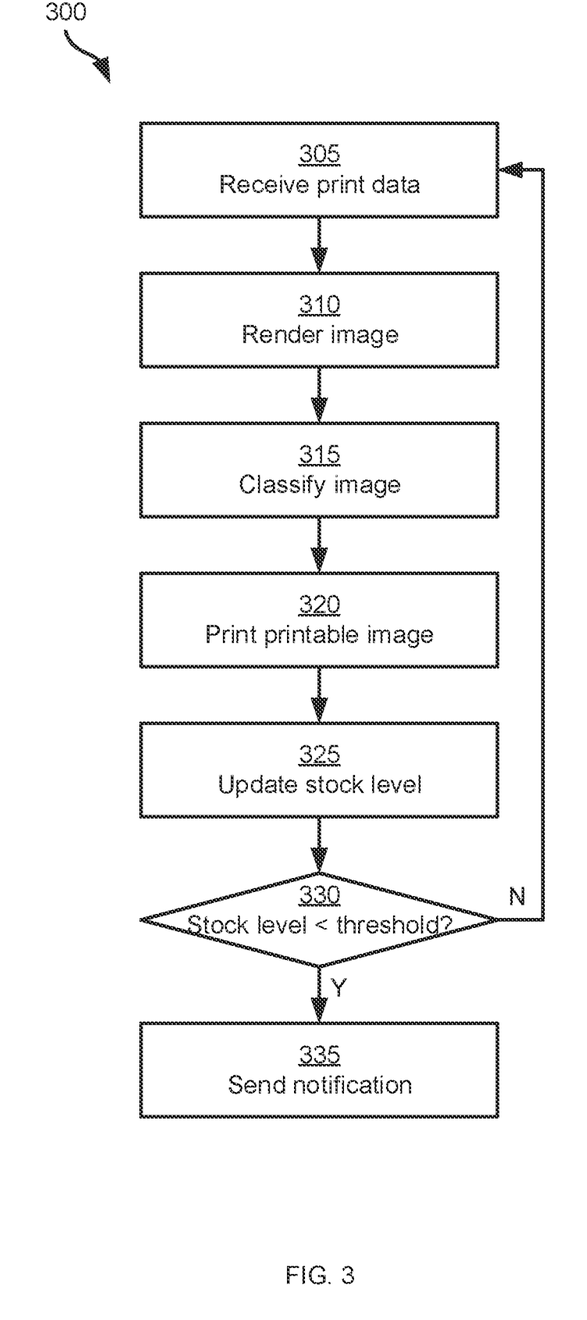
FIG. 3 is a flowchart of an example method of classifying media in the system of FIG. 1.

FIG. 3 illustrates a method 300 of classifying media, which will be described in conjunction with its performance in the system 100, and in particular by the device 104, with reference to the components illustrated in FIGS. 1 and 2. In other examples, the method 300 may be performed by other suitable computing devices, such as the server 108.

The method 300 begins at block 305, where the printing device 104 receives print data representing media to be printed at the printing device 104. The print data may be received, for example, from the computing device 112.

At block 310, the printing device 104 generates an image of the media to be printed based on the print data. That is, the printing device 104 parses the print data and renders the media as an image for printing. For example, the media may be rendered as a bitmap image.

At block 315, the printing device 104 uses the image generated at block 310 and classifies the image to obtain a media stock type associated with the media to be printed. For example, the printing device may compare the image to established signature maps stored in the repository 212. In particular, the signature maps stored in the repository 212 represent features of the media which remain substantially static between media of the same media stock type. The signature maps may include features such as image dimensions (i.e., the length/width of the media image), headings, tables, graphical icons, barcode locations, and the like. Accordingly, to classify the image, the printing device 104 may generate a signature map for the image based, for example, on features such as the length/width of the image, average dot coverage, center of dot mass, and image segmentation. For example, the image may be segmented into multiple rectangular regions, and data such as average dot coverage and center of dot mass collected for each region. Together, the statistics of each region rectangular region of the image may define the signature map of the image. The signature map may be compared to the established signature maps stored in the memory to identify the media stock type associated with the media.

In some examples, alternately or in addition to comparing signature maps of the image, the printing device 104 may input the image and/or the signature map into an artificial intelligence engine (e.g., employing machine learning techniques, neural networks, or the like).

Figure 4:
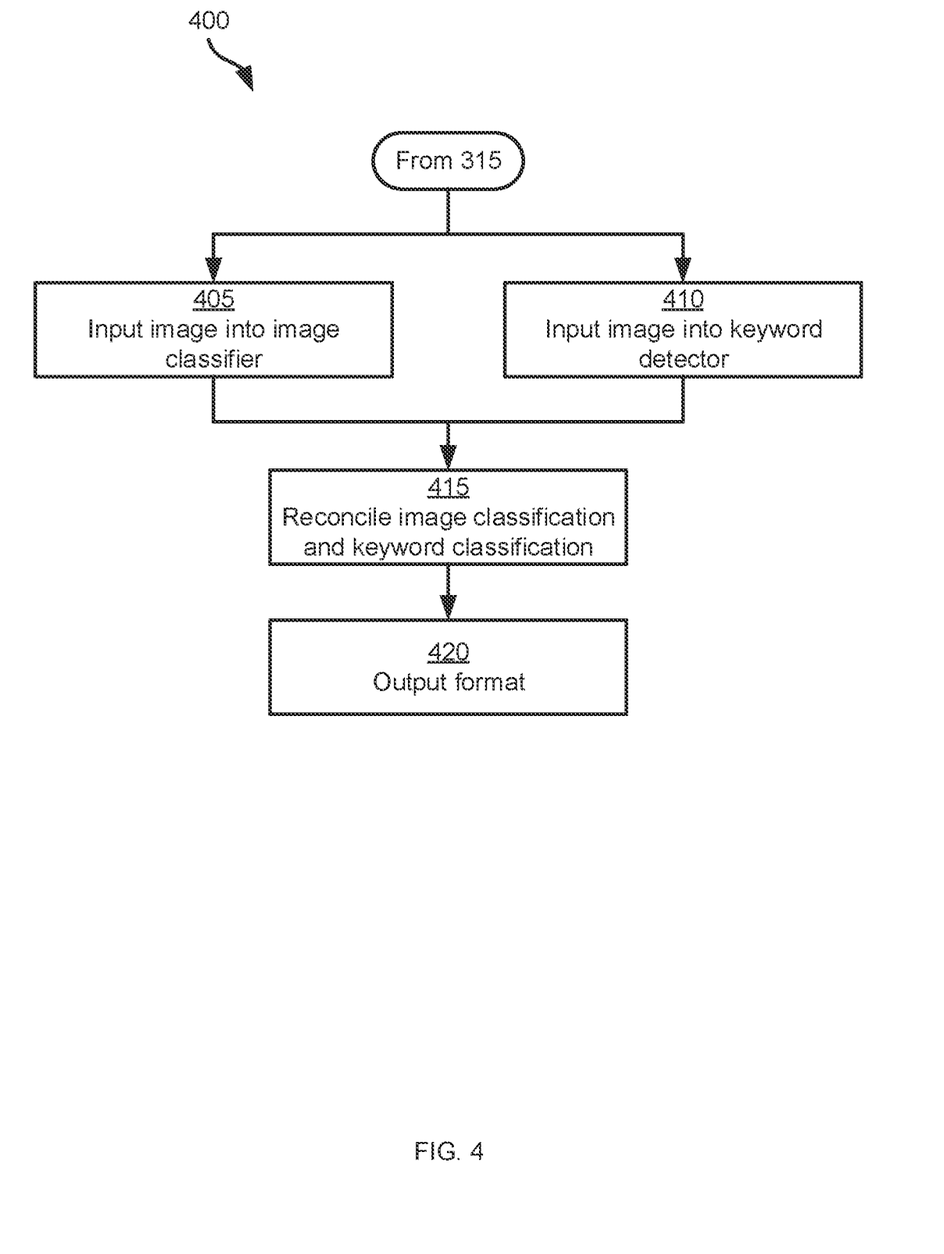
FIG. 4 is a flowchart illustrating an example performance of block 315 of the method of FIG. 3.

For example, referring to FIG. 4, an example method 400 of classifying the image is depicted. In particular, the method 400 employs parallel image and keyword classifiers to obtain a predicted media stock type. The method 400 is described in conjunction with its performance by the printing device 104. In other examples, the method 400 may be performed by the server 108 (e.g., after receiving the print data and/or the image representing the media to be classified from the printing device 104) or other suitable devices.

At block 405, the printing device 104 inputs the image into an image classifier to obtain an image classification. In particular, the image classifier is configured to classify the media image using the entire image, including the overall spatial and textual representation of the media components, such as barcodes, text, and graphical icons. That is, the image classifier considers the spatial configuration and relationship of the components with respect to one another. The image classifier may utilize, for example, support vector machine algorithms, deep neural networks, or the like. In some examples, the signature map associated with the image may additionally be input into the image classifier with the image. In other examples, generation of the signature map of the image may be part of the image classification process by the image classifier.

Figure 5A:
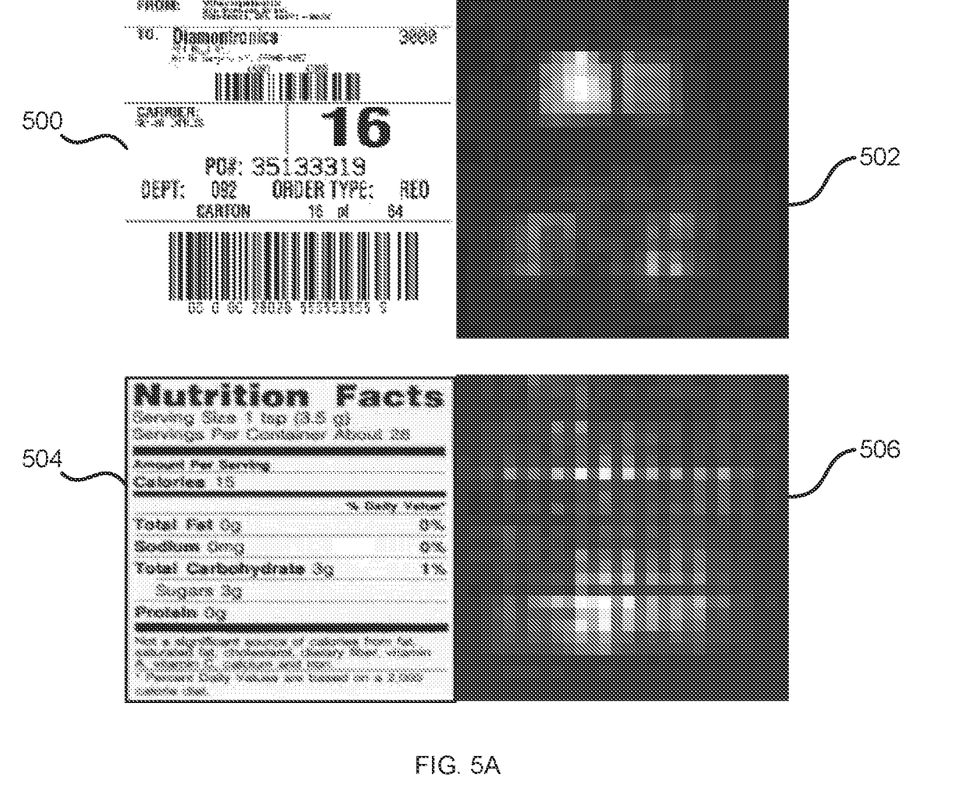
FIGS. 5A and 5B is a schematic diagrams illustrating the media classification at block 315 of the method of FIG. 3.

For example, referring to FIG. 5A, a shipping label 500 and its associated signature map 502 as well as a nutrition label 504 and its associated signature map 506 are depicted. The image classifier may therefore be trained to recognize the signature map 502 having a smaller barcode in the upper half of the shipping label 500, and a larger barcode in the bottom half of the shipping label 500, as well as the general structure of the nutrition label 504 having fairly consistent dark regions/lines and text across the nutrition label 504 and hence the signature map 506. After analyzing the image, the image classifier outputs an image classification—that is, a media stock type predicted based on the image as a whole. For example, based on the differences between the signature maps 502 and 506, as well as comparisons to established signature maps, the image classifier may output an image classification of "shipping label" for the shipping label 500 and "nutrition label" for the nutrition label 504.

The image classifier may be trained using a pre-trained model with sample annotated images. The image classification may generally correspond to predefined media stock types defined in the repository 212. Additionally, the image classifier may be configured to dynamically classify the image into a new image classification (i.e., not corresponding to any of the predefined media stock types defined in the repository 212) when the image does not sufficiently correspond with the established signature maps and holistic feature components of the established image classifications.

In parallel with the image classification of block 405, at block 410, the printing device 104 inputs the image into a keyword detector to obtain a keyword classification. In particular, the keyword detector is configured to classify the media image by detecting and identifying predefined keywords and their associated locations. That is, the keyword detector utilizes fine local features and the corresponding locations of the features to classify the media image.

Figure 5B:
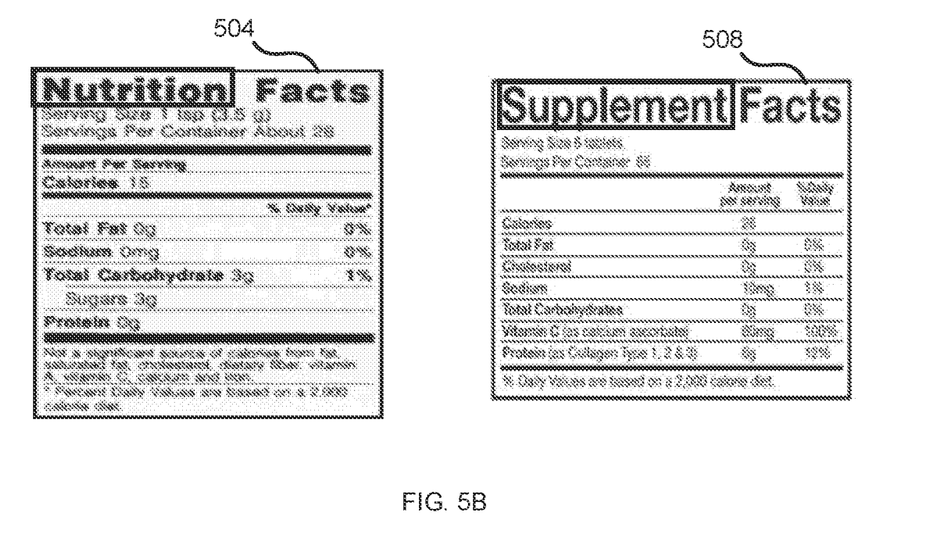

For example, referring to FIG. 5B, the nutrition label 504 and a supplement label 508 are depicted. The labels 500 and 504 for nutrition facts and supplement facts may have similar overall layouts and spatial configurations of key features. The keyword detector may therefore be trained to identify and detect the text "NUTRITION" and "SUPPLEMENT" near an upper edge of the media image. After analyzing the image, the keyword detector outputs a keyword classification—that is, a media stock type predicted based on the keywords or other fine local features of the media image. For example, the keyword detector may use the identified keywords of "NUTRITION" or "SUPPLEMENT" to output a "nutrition label" keyword classification for the label 500 and a "supplement label" keyword classification for the label 504.

Returning to FIG. 4, at block 415, the printing device 104 reconciles the image classification output by the image classifier at block 405 and the keyword classification output by the keyword detector at block 410. For example, if the image classification and the keyword classification output the same media stock type, that media stock type may be identified as the classification of the image. If the image classification and the keyword classification do not match, the printing device 104 may compare confidence levels associated with each of the image and keyword classifications. In other examples, the printing device 104 may follow a predefined rule set to assign suitable weightings to the image classification when the image classifier detects certain media stock types and the keyword classification when the keyword detector detects certain media stock types. In further examples, the image classification and the keyword classification may be input into an ensemble classifier which performs the reconciliation based on a pretrained model. In particular, the ensemble classifier may account for the confidence levels and rule sets for weighting the classifications as determined by artificial intelligence (e.g., machine learning, neural networks, and the like) algorithms.

At block 420, after reconciling the image classification and the keyword classification, the printing device 104 outputs a single reconciled classification as the media stock type associated with the media to be printed. The printing device 104 may then return to the method 300.

In another example, rather than applying the image classification and the keyword detector in parallel, the printing device 104 may use a hierarchical classification method to classify the image. For example, referring to FIG. 6, another example method 600 of classifying the media image is depicted. In particular, the method 600 employs hierarchical image and keyword classifiers to obtain a predicted media stock type. The method 600 is described in conjunction with its performance by the printing device 104. In other examples, the method 400 may be performed by the server 108 (e.g., after receiving the print data and/or the image representing the media to be classified from the printing device 104) or other suitable devices.

Figure 6:
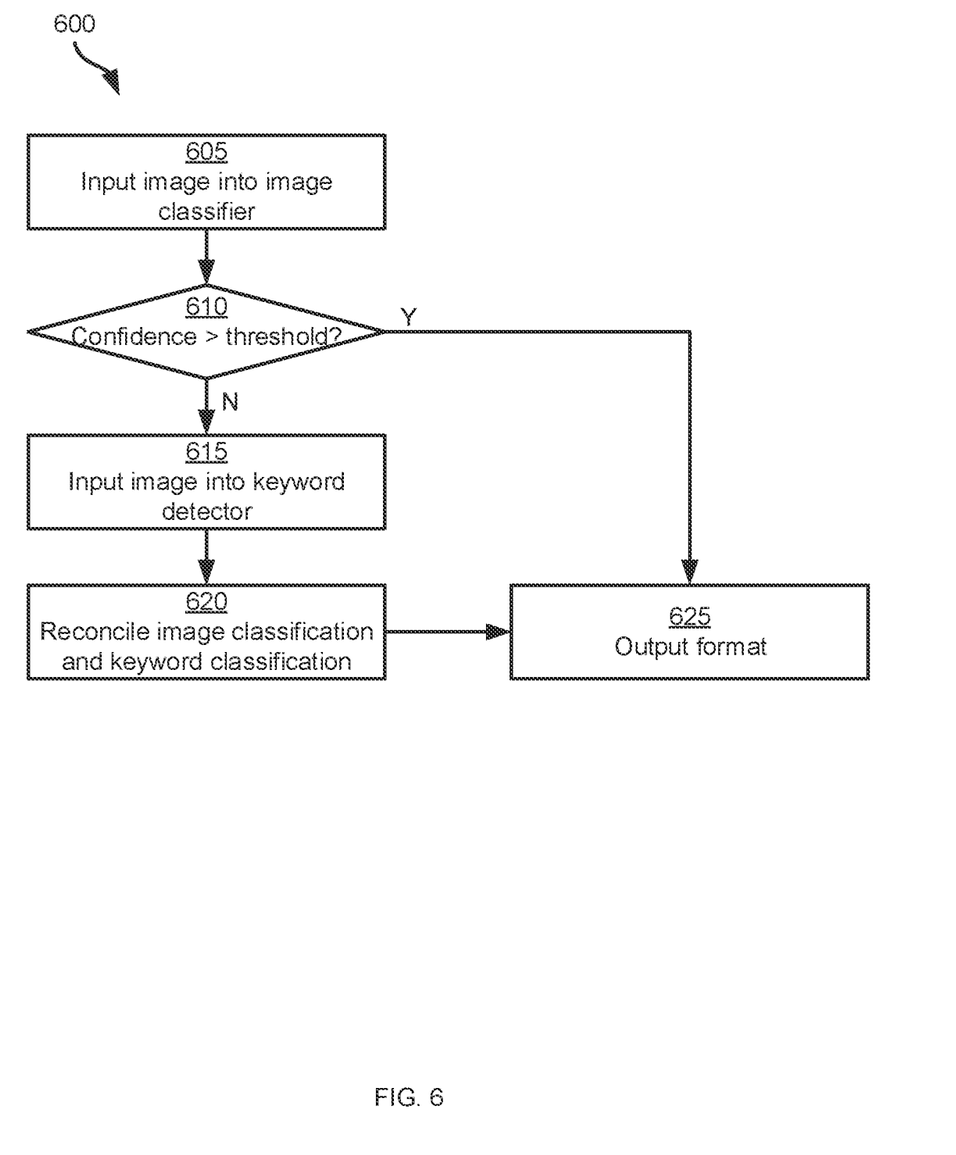
FIG. 6 is a flowchart illustrating another example performance of block 315 of the method of FIG. 3.

The method 600 begins at block 605, where the printing device 104 inputs the image into an image classifier. The image classifier may be similar to the image classifier employed at block 405 of the method 400. In particular, the image classifier is configured to classify the media image using the entire image, including the overall spatial configuration and textual representations of the media components. The image classifier may utilize support vector machine algorithms, deep neural networks, or the like. In some examples, the signature map associated with the image may additionally be input into the image classifier with the image. In other examples, generation of the signature map of the image may be part of the image classification process by the image classifier. The image classifier may be trained using a pre-trained model and may output both image classifications corresponding to predefined media stock types defined in the repository 212 as well as dynamically determined new image classifications.

After analyzing the image, the image classifier outputs an image classification. In addition to outputting the image classification, the image classifier outputs a confidence level associated with the image classification. The confidence level represents a likelihood, as designated by the image classifier, that the identified image classification is the correct classification.

At block 610, the printing device 104 determines if the confidence level associated with the image classification from block 605 is greater than a threshold confidence level. The threshold confidence level may be selected based, for example, on the number of media stock types, the number of visually similar media stock types, desired accuracy of the classification, and other factors. For example, the confidence level may be about 70%, about 90% or other suitable thresholds.

If the determination at block 610 is affirmative, that is the confidence level of the image classifier is above the threshold confidence level, the printing device 104 proceeds to block 625. That is, if the confidence level of the image classifier is above the threshold confidence level, no further analysis is required to confirm the image classification, and hence the image classification may be output as the predicted media stock type. For example, when classifying the shipping label 500, the image classifier may identify an image classification of "shipping label" with about 95% confidence. Accordingly, the printing device 104 may proceed to block 625 to use the image classification of "shipping label" as the media stock type.

If the determination at block 610 is negative, that is the confidence level of the image classifier is below the threshold confidence level, the printing device 104 proceeds to block 615. That is, if the confidence level of the image classifier is sufficiently low, the printing device 104 determines that further analysis is required to confirm the image classification before outputting a predicted media stock type. For example, when classifying the nutrition label 504, the image classifier may identify an image classification of "nutrition label" with a confidence level of about 65%. Accordingly, the printing device 104 may proceed to block 615.

At block 615, the printing device 104 inputs the image into a keyword detector to obtain a keyword classification. The keyword detector may be similar to the keyword detector employed at block 410 of the method 400. In particular, the keyword detector is configured to classify the media image by detecting and identifying predefined keywords and their associated locations. That is, the keyword detector utilizes fine local features and the corresponding locations of the features to classify the media image. After analyzing the image, the keyword detector outputs a keyword classification.

At block 620, the printing device 104 reconciles the image classification output by the image classifier at block 605 and the keyword classification output by the keyword detector at block 615. For example, since the confidence level of the image classification output by the image classifier was low, in some examples, the printing device 104 may simply take the keyword classification as the media stock type. In other examples, the printing device 104 may follow a predefined rule set to assign suitable weightings to the image classification and the keyword classification. For example, the printing device 104 may apply inference voting to the image classification and the keyword classification based on the respective confidence levels of each to obtain a single classification for the image. In some examples, the inference voting and/or other reconciliation of the image classification and the keyword classification may be applied by a pre-trained artificial intelligence engine.

For example, when classifying the nutrition label 504, the keyword detector may identify the word "NUTRITION" near the top of the label 504, and hence the reconciliation may result in a classification of "nutrition label" for the label 504. Similarly, when classifying the supplement label 508, the image classifier may identify the label 508 as a "supplement label" with low confidence, or even erroneously as a "nutrition label" with low confidence. Accordingly, when the keyword detector detects the word "SUPPLEMENT" near the top of the label 508, and hence the reconciliation may result in a classification of "supplement label" for the label 508.

At block 625, after reconciling the image classification and the keyword classification, the printing device 104 outputs a single reconciled classification as the media stock type associated with the media to be printed. The printing device 104 may then return to the method 300.

The method 600 may be utilized, for example when the printing device 104 has limited computational capacity, as the keyword detector may be more computationally complex than the image classifier. Similarly, when the printing device 104 has sufficient computational capacity, the printing device 104 may apply the image classifier and the keyword detector in parallel via the method 300 to produce more accurate classification results.

Returning to FIG. 3, at block 320, the printing device 104 prints the media in accordance with the print data.

At block 325, the printing device 104 updates a stock level associated with the media stock type. In particular, the printing device 104 may store the updated stock level in the repository 212. In some examples, if multiple media stock types utilize the same stock (i.e., while they may be classified differently based on visual characteristics, they may utilize the same stock rolls), the printing device 104 may aggregate the stock levels and update the aggregate threshold stock level. In other examples, the stock level may not be directly associated with the media stock type; rather, the media stock type may be associated with an intermediary stock type which has an associated stock level which is updated at block 325.

Optionally, at block 330, the printing device 104 may compare the stock level updated at block 325 to a threshold stock level. If the stock level of the media stock type is at or above the threshold stock level, the printing device 104 takes no action and returns to block 305 when it receives print data for the next printing operation.

If the stock level of the media stock type is below the threshold stock level, the printing device 104 proceeds to block 335. At block 335, the printing device 104 may send a notification, such as an email, text message, audio or visual alert, or the like, to a client device, such as the computing device 112. In some examples, the notification may be a re-supply notification to re-order new stock of the media supply. Thus, the system 100 allows for automatic counting of each stock type based on the association of each media image to the media stock type. Further, the automatic counting may allow signals, warnings and re-supply orders to be automated.

In the foregoing specification, specific embodiments have been described.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a printer;
a server in communication with the printer, the server being configured to:
receive print data representing the printable image to be printed by the printer;
generate an image of the printable image based on the print data;
classify the image to obtain a format associated with the printable image;
communicate with the printer to print the printable image according to the print data; and
wherein, to classify the image, the server is configured to:
input the image into an image classifier to obtain an image classification;
input the image into a keyword detector to obtain a keyword classification; and
reconcile the image classification and the keyword classification to obtain the format associated with the printable image.

2. The system of claim 1, wherein to reconcile the image classification and the keyword classification, the server is configured to input the image classification and the keyword classification into an ensemble classifier to obtain the format associated with the printable image.

3. The system of claim 1, wherein, to classify the image, the server is configured to:
input the image into an image classifier to obtain an image classification;
when a confidence level associated with the image classification exceeds a threshold confidence level, use the image classification as the format associated with the printable image; and
when the confidence level associated with the image classification does not exceed the threshold confidence level, input the image into a keyword detector to obtain the format associated with the printable image.

4. The system of claim 1, wherein, to classify the image, the server is configured to:
obtain a signature map for the image; and
compare the signature map to established signature maps stored in memory to identify the format associated with the printable image.

5. The system of claim 4, wherein to obtain the signature map, the server is configured to analyze one or more of: image dimensions, average dot coverage, center of dot mass, and image segmentation.

6. The system of claim 4, wherein to compare the signature map to established signature maps, the server is configured to input the signature map into a machine learning engine to identify the format associated with the printable image.

7. The printing device of claim 1, wherein the server is further configured to:
update a counter associated with the format in response to printing the printable image;
update a stock level of a media stock type for the label format based on the counter for the format; and
send a notification to a client device when the stock level of the media stock type falls below a threshold stock level.

8. The printing device of claim 1, wherein the print data comprises form data defining a selected form to be used and having a plurality of fields, and field data defining data to input in each field of the selected form; and wherein to render the printable image, the processor is configured to:

input the field data into each field of the selected form; and render the image according to the form data.

9. A system comprising:

a printer;

a server in communication with the printer, the server configured to:
- receive print data representing the printable image to be printed by the printer;
- generate an image of the printable image based on the print data;
- classify the image to obtain a format associated with the printable image;
- communicate with the printer to print the printable image according to the print data; and
- wherein, to classify the image, the processor is configured to:
  - input the image into an image classifier to obtain an image classification;
  - when a confidence level associated with the image classification exceeds a threshold confidence level, use the image classification as the format associated with the printable image; and
  - when the confidence level associated with the image classification does not exceed the threshold confidence level, input the image into a keyword detector to obtain the format associated with the printable image.

10. The system of claim 1, wherein, to classify the image, the server is configured to:
- obtain a signature map for the image; and
- compare the signature map to established signature maps stored in memory to identify the format associated with the printable image.

11. The system of claim 10, wherein to obtain the signature map, the server is configured to analyze one or more of: image dimensions, average dot coverage, center of dot mass, and image segmentation.

12. The system of claim 10, wherein to compare the signature map to established signature maps, the server is configured to input the signature map into a machine learning engine to identify the format associated with the printable image.

13. The system of claim 9, wherein the server is further configured to:
- update a counter associated with the format in response to printing the printable image;
- update a stock level of a media stock type for the label format based on the counter for the format; and
- send a notification to a client device when the stock level of the media stock type falls below a threshold stock level.

14. The system of claim 9, wherein the print data comprises form data defining a selected form to be used and having a plurality of fields, and field data defining data to input in each field of the selected form; and wherein to render the printable image, the processor is configured to:
- input the field data into each field of the selected form; and
- render the image according to the form data.

15. A system comprising:

a printer;

a server in communication with the printer, the server configured to:
- receive print data representing the printable image to be printed;
- generate an image of the printable image based on the print data;
- classify the image to obtain a format associated with the printable image;
- communication with the printer to print the printable image according to the print data; and
- wherein the print data comprises form data defining a selected form to be used and having a plurality of fields, and field data defining data to input in each field of the selected form; and
- wherein to render the printable image, the processor is configured to:
  - input the field data into each field of the selected form; and
  - render the image according to the form data.

16. The system of claim 15, wherein, to classify the image, the server is configured to:
- input the image into an image classifier to obtain an image classification;
- input the image into a keyword detector to obtain a keyword classification; and
- reconcile the image classification and the keyword classification to obtain the format associated with the printable image.

17. The system of claim 15, wherein, to classify the image, the server is configured to:
- input the image into an image classifier to obtain an image classification;
- when a confidence level associated with the image classification exceeds a threshold confidence level, use the image classification as the format associated with the printable image; and
- when the confidence level associated with the image classification does not exceed the threshold confidence level, input the image into a keyword detector to obtain the format associated with the printable image.

18. The system of claim 15, wherein, to classify the image, the server is configured to:
- obtain a signature map for the image; and
- compare the signature map to established signature maps stored in memory to identify the format associated with the printable image by inputting the signature map into a machine learning engine to identify the format associated with the printable image.

* * * * *